United States Patent
Kumar et al.

(10) Patent No.: US 10,990,532 B2
(45) Date of Patent: Apr. 27, 2021

(54) OBJECT STORAGE SYSTEM WITH MULTI-LEVEL HASHING FUNCTION FOR STORAGE ADDRESS DETERMINATION

(71) Applicant: Intel Corporation, Santa Clara, CA (US)

(72) Inventors: Mohan J. Kumar, Aloha, OR (US); Anjaneya R. Chagam Reddy, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 15/940,961

(22) Filed: Mar. 29, 2018

(65) Prior Publication Data
US 2019/0042440 A1    Feb. 7, 2019

(51) Int. Cl.
*G06F 12/0864* (2016.01)
*G06F 3/06* (2006.01)

(52) U.S. Cl.
CPC .......... *G06F 12/0864* (2013.01); *G06F 3/067* (2013.01); *G06F 3/0607* (2013.01); *G06F 3/0659* (2013.01); *G06F 2212/1016* (2013.01)

(58) Field of Classification Search
CPC .... G06F 12/0864; G06F 3/0607; G06F 3/067; G06F 3/0659; G06F 2212/1016; G06F 16/1824; G06F 16/13; G06F 16/172; G06F 16/184
See application file for complete search history.

(56) References Cited

U.S. PATENT DOCUMENTS

| | | | |
|---|---|---|---|
| 9,571,570 B1 | 2/2017 | Mutnuru | |
| 2010/0146053 A1* | 6/2010 | Jiang | H04L 29/125 709/204 |
| 2010/0162035 A1 | 6/2010 | Rancurel et al. | |
| 2016/0188591 A1* | 6/2016 | Bestler | G06F 16/2255 707/744 |

OTHER PUBLICATIONS

"Consistent Hashing", Wikipedia, https://en.wikipedia.org/wiki/Consistent_hashing, last edit Feb. 2, 2018, 4 pages.
"Rendezvous Hashing", Wikipedia, https://en.wikipedia.org/wiki/Rendezvous_hashing, 6 pages.
Garg, Nikhil, "How Does Rendezvous Hashing Compare with Consistent Hashing? When should one be chosen over the other?" https://www.quora.com/How-does-rendezvous-hashing-compare-with-consistent-hashing-When-should-one-be-chosen-over-the-other.

(Continued)

*Primary Examiner* — David Yi
*Assistant Examiner* — Alan Otto
(74) *Attorney, Agent, or Firm* — Compass IP Law PC (57) ABSTRACT

A method performed by a first hardware element in a hierarchical arrangement of hardware elements in an object storage system is described. The method includes performing a hash on a name of an object of the object storage system. The name is part of a request that is associated with the object. A result of the hash is to identify a second hardware element directly beneath the first hardware element in the hierarchical arrangement. The request is to be sent to the second hardware element to advance the request toward being serviced by the object storage system.

21 Claims, 4 Drawing Sheets

(56) References Cited

OTHER PUBLICATIONS

Thaler, David G., "Using Name-Based Mappings to Increase Hit Rates", EEE/ACM Transactions on Networking, 1997, vol. 6, pp. 1-14.

Elghamrawy, Sally M. et al., A Partitioning Framework for Cassandra NoSQL Database Using Rendezvous Hashing, Journal of Supercomputing, Kluwer Academic Publishers, Dordrecht, NL., vol. 73, No. 10, Apr. 6, 2017, pp. 4444-4465.

Extended European Search Report for Patent Application No. 19159540.4, dated Jul. 8, 2019, 13 pages.

* cited by examiner

OBJECT STORAGE SYSTEM WITH MULTI-LEVEL HASHING FUNCTION FOR STORAGE ADDRESS DETERMINATION

FIELD OF INVENTION

The field of invention pertains generally to the computing sciences, and, more specifically, to an object storage system with multi-level hashing function for storage address determination.

BACKGROUND

With the emergence of cloud computing and high performance data centers as an infrastructure environment for modern day computing, innovations are being made in large scale data storage. One particular emerging storage approach, referred to as object storage, is characterized by a highly versatile input namespace, ease of operation with distributed storage nodes and corresponding large scale storage capacity. When attempting to physically build the hardware and/or software needed to implement an actual, working object storage system, however, issues of practical implementation may be observed resulting in an opportunity for practical innovation improvements.

FIGURES

A better understanding of the present invention can be obtained from the following detailed description in conjunction with the following drawings, in which.

DETAILED DESCRIPTION

An issue with object storage systems is the movement of data objects as a consequence of storage nodes being added or deleted from the system. Here, as observed in FIG. 1, an object storage system 100 is typically implemented with a number of storage nodes 101 that are communicatively coupled to a network 102. Each storage node contains one or mass storage devices having associated storage locations and corresponding storage location addresses.

Figure 1:
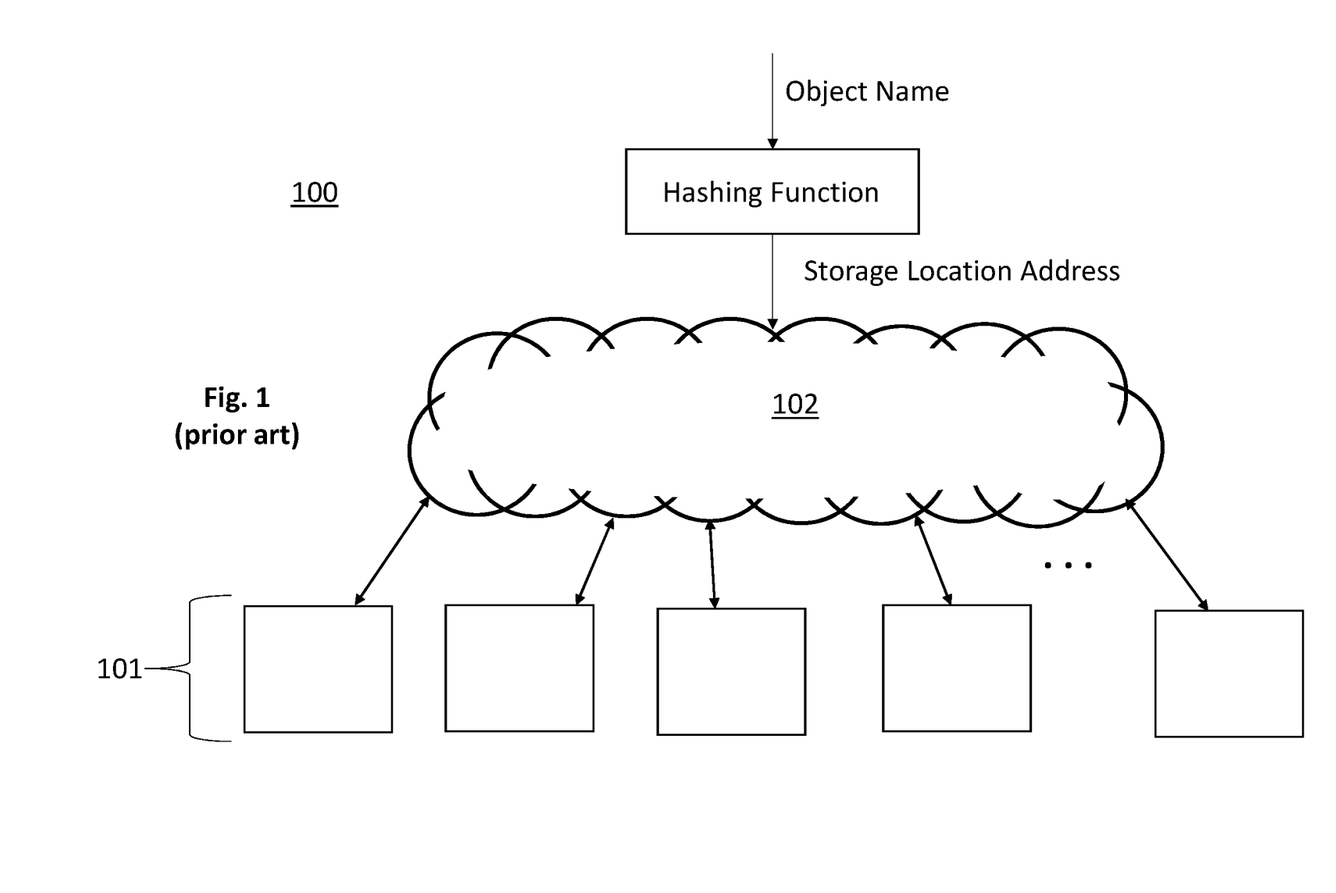
FIG. 1 shows a prior art object storage system.

When a client submits an object for storage in the system 100, the system performs a hashing operation upon the name given to the object by the client (e.g., a directory file path for the object, a unique identifier assigned to the object, etc.). The output of the hashing operation essentially generates address of the storage location in the system where the object is to be stored. Each of the storage nodes in the system 101 is assigned a different range of object storage location addresses. If a new storage node is added to the system or deleted from the system, the per storage node object address location assignments change which requires the movement of some objects from their present storage node to a new storage node.

Figure 2:
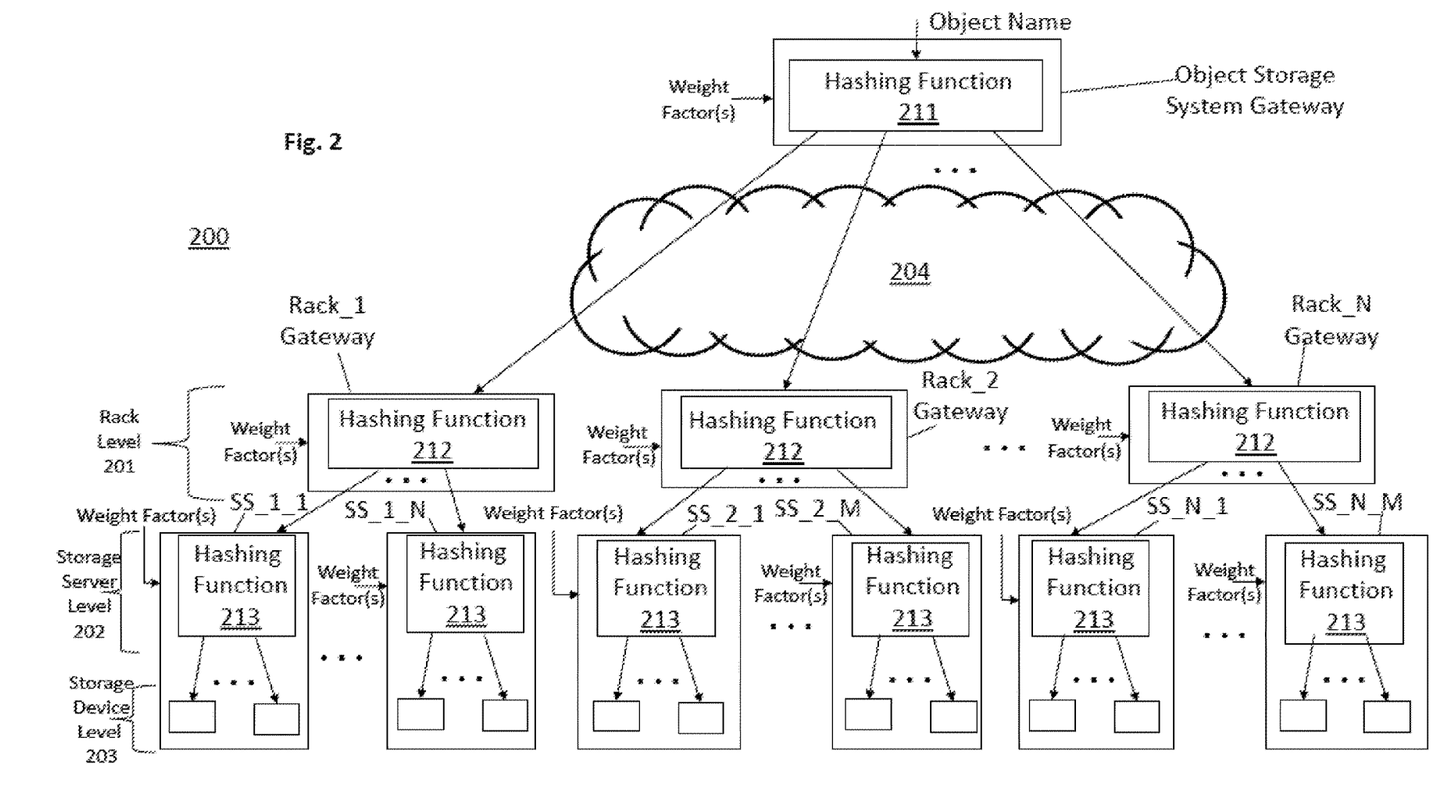
FIG. 2 shows an improved object storages system.

FIG. 2 shows an improved object storage system design 200. According to the object storage system design of FIG. 2, the architecture of the system takes the form of a nodal tree in which each higher level node of the tree subsumes the lower level nodes beneath it. The lowest level 204 of the tree corresponds to leaf nodes having the actual storage media devices (e.g., flash drives, hard disk drives, etc.). Additionally, each nodal level is preceded with a dedicated hashing function for that nodal level that identifies a particular node at the nodal level to which a particular object, based on its name, is to be mapped. For simplicity FIG. 2 shows an object storage system 200 with only three nodal levels 201, 202, 203 (and therefore three hashing functions 211, 212, 213 that precede them). However, the reader will understand that additional nodal levels and corresponding hashing functions can be added to the three-level system of FIG. 2.

Referring to FIG. 2, when a new object is to be stored in the system, the first hashing function 211 determines to which of the highest level nodes 201 the object is to be mapped and the object is sent over a network 204 to that node. Each of the highest level nodes 201 include an instance of a second hashing function 212. The particular highest level node that the object mapped to computes a second hash on the object name with the second hashing function 212. The result identifies a node at the next lower level 202 that the object maps to and the object is sent over a network to that node. The next lower level node also includes an instance of a third hashing function 213. The particular next lower level node that the object mapped to computes a third hash on the object name. The result identifies a node at the lowest, leaf node level 203 that the object maps to. The object is sent to that leaf node and is stored therein.

Additionally, each of the hashing algorithms 211, 212, 213 are weighted to have some bias, or will otherwise assign objects to immediately lower nodes in a purposely imbalanced way, if the structure of the object storage system beneath the hashing function is likewise biased or imbalanced. For example, if a first immediately lower node has more storage capacity beneath it and/or more I/O bandwidth than a second immediately lower node, the hashing function that feeds the first and second nodes will be structured to map more objects to the first node than the second node.

Here, each hashing function 211, 212, 213 is presented with some description of the storage system structure directly beneath it. The description essentially describes, e.g., the total storage capacity, bandwidth capacity, media type, processor speed, etc. at and/or beneath each node that it maps objects to. The description may be automatically calculated from child node descriptions. In further embodiments an administrator or administration function can override automatic description settings to meet various service level agreements.

In the case of higher level hashing algorithms that map objects to higher level nodes, the storage capacity of a higher level node corresponds to the combined storage capacity of the leaf nodes beneath it. Thus, for instance, the storage capacity of Rack_1 corresponds to the combined storage capacity of storage server nodes SS_1_1 through SS_1_N. The description of the performance capability of one or more of the nodes directly beneath a hashing level can also be referred to, in various embodiments, as a "weight factor". Hence, each hashing level 211, 212, 213 receives one or more weight values describing the capability of the storage system nodes directly beneath it so that it can weigh or bias object storage location assignments in response to any imbalances in the capabilities of the nodes directly beneath it if such imbalances exist.

In further embodiments, seed values may be assigned to each node in the hierarchical tree of the object storage system. Seed values are randomized numbers that are used for the hashing calculations. In various embodiments, the aforementioned one or more weight factors are presented as input value(s) to a random number generator at a particular node. The random number generator then generates a seed value for the node's hashing function. In this manner, each node in the tree generates a seed value and then uses the seed value to perform hashes with the object name of each request received by the node to determine a next lower node that the request is to be directed to.

The seed value generated at each node therefore includes some randomness owing to its being generated from a random number generator (if all lower nodes are equal, requests should be mapped randomly to the lower nodes). The weights therefore provide some bias to the randomness of the seed values that causes the hashing function to favor one node (e.g., having more storage capacity) over another node (e.g., having less storage capacity) when determining which lower node a request it to be mapped to. In alternate embodiments, weight factors may be sent to a centralized location (e.g., that maintains an understanding of the object storage system's hierarchical tree) having a random generator that calculates seed values for multiple nodes of the system. The centralized location may then send the appropriate seed values to the different nodes for incorporation by their respective hashing functions.

In an embodiment, execution of any particular one of the hashing algorithms with its corresponding object name, input weight factor(s) and seed value generates a ranking of all the nodes directly beneath the hashing level. The hashing algorithm then picks the highest ranked node as the node to which the object should be mapped (i.e., the object's assigned storage location falls within the range of location addresses assigned to the selected node).

In various embodiments, each nodal level corresponds to a different element of hardware in the overall object storage solution. The highest nodal level 201 in the exemplary system of FIG. 2 corresponds to a rack of storage servers. Here, as is known in the art, a rack is typically implemented as one or more cabinets having shelf space or otherwise retrofitted to safely stack electronic equipment. In the case of an object storage system, the rack may stack storage servers, which, e.g., are servers that emphasize storage by, e.g., having most/all of the higher bandwitdh I/O interfaces of the server computer coupled to non volatile mass storage devices (e.g., a solid state drives (e.g., flash SDD) and/or hard disk drives).

In the exemplary system of FIG. 2, with the highest level nodes 201 corresponding to a different rack, then, each of the immediately lower level nodes 202 directly beneath a particular rack/node correspond to the different storage servers that are stacked in the rack. In turn, each leaf node beneath a particular storage server node in FIG. 2 corresponds to a particular non volatile mass storage device that is integrated with the particular server node (e.g., its coupled to one of the server's high bandwidth I/O interfaces). From this example, as the object storage system expands in scale and/or more granularized hardware boundaries are desired per nodal level, higher level nodes may be added above the highest level nodes.

For example, in the case of expansion, if the set of racks and corresponding equipment observed in FIG. 2 correspond to the set of equipment within a first data center, and then the system is expanded to include more data centers, higher level nodes can be added to those observed in FIG. 2 such that each added higher level node corresponds to a different data center.

In the case of more granularized hardware boundaries, for example, even if the equipment observed in FIG. 2 corresponds to the equipment within a same data center, different groups of racks may be coupled to different local area networks within the data center. As such, higher level nodes may be added where each added higher level node corresponds to the gateway to a specific local area network and the racks/nodes beneath each added higher level node correspond to the racks that are coupled to the local area network that is represented by the higher level node. Additional nodes may also be added below the rack level to introduce more finely granularized hardware boundaries within a rack. For example, a nodal level may be added between the storage server level and the mass storage device level to group those mass storage devices that are coupled to a same I/O interface of a particular storage server.

Regardless, note that the architecture may include the introduction of an object storage hashing function in various types of hardware resources for the purpose of mapping an object to a particular lower level hardware resource, where, the hardware resource is more of a component of the storage hardware infrastructure itself than a centralized object mapping function for the object storage system (whose purpose is to determine global object mappings that definitively define object storage locations from a single hashing operation).

That is, to some extent, the new approach of FIG. 2 can be viewed as taking a centralized object mapping function as described above with respect to FIG. 1 and not only distributing it, but distributing down through multiple, lower hierarchical levels of the storage hardware itself (e.g., a local area network gateway, a network gateway that is integrated into a rack, a storage server, an interface to a storage server I/O interface, etc.).

The distribution of the hashing function activity needed to fully resolve a final storage location for a particular object through different levels of the storage hardware helps insulate the overall storage system from object re-location after the addition or removal of a storage capacity. Here, a single global hashing function is apt to have names of objects resolve to different storage locations in a more disruptive way in response to the addition/removal of a storage node than an object storage system constructed according to the hashing structure of FIG. 2.

Qualitatively describing the mathematical behavior, if a single hashing function is solely responsible for determining the storage locations of all objects in the system, a single change to the storage capacity of the system (even a small one) may cause large numbers of object names to suddenly map to physically distant new locations (e.g., to a new local network, to a different rack, etc.). To suppress this particular effect, object storage systems have traditionally been implemented with consistent hashing algorithms which mathematically have reduced numbers of mapping changes in response to storage capacity change than other hashing functions. Conceivably, however, the resulting relocations may still require significant physical transportation of objects across the system.

However, the object storage system of FIG. 2, which implements the overall hashing activity as a sequence of hashing processes that "thread" from higher hardware levels to lower hardware levels, may exhibit even less physical object transportation disturbance than a consistent hashing algorithm, at least for lower level nodal changes, because the hashing structure is better able to account for the fact that much of the system remains unchanged when only a smaller (lower level) region of the system has changed.

That is, referring to FIG. 2, if a new mass storage device is added/deleted to/from storage server SS_1_1, note that the storage capacity of the remaining storage servers across level 202 remain unchanged. Therefore, ideally, many if not all mapping changes that result from the change in storage capacity may be kept within storage server SS_1_1. In a sense, a small change at a lower node does not "ripple up" (or hardly ripples up) to the higher level hashing functions, which, in turn, result in minimal changes to the mappings of the nodes that little/no nodal relationship in the system.

In practice this is represented by little if any change to the weight factors that are applied to the higher level hashing functions in response to the change. Here, if only a single mass storage device is added/deleted to/from storage server SS_1_!, the total storage capacity of rack Rack_1 would hardly change which, in turn, would result in only the slightest of changes, if any, to the weight values that are provided to the highest level hashing function 211. That is, e.g., the change to the percentage of the overall object storage's capacity that Rack_1 represents is almost negligible, and, therefore, the weight values that are provided to the highest hashing level 211 would suffer almost negligible change in response. As such, the mapping determinations made at the highest hashing level 211 would hardly experience any change at all.

Contra-wise, the weight values provided to the lowest hashing level 213 that resides directly above where the change occurred (the hashing function of server SS_1_1) may see much more significant change (the addition/removal of the storage device to/from server SS_1_1 noticeably changes the server's total storage capacity). As such, there may be more substantial mapping change and corresponding object movement within server SS_1_1 and even less change (but perhaps still noticeable change) within the other servers that are part of Rack_1. That is, object mapping changes are kept more local to the point of the addition/removal disturbance.

In furtherance of this property, other embodiments may be designed to forcibly prevent weight value changes for hashing instances that are not local to a disturbance. For example, referring to the prior example where server SS_1_1 has a mass storage device added or removed, in an embodiment, the only weight value that is allowed to change is the weight value for storage server SS_1_1—all other weight values in the system are deliberately kept fixed. By preventing all other weight values from changing, all hashing instances other than the hashing instance of server SS_1_1 will not modify any of their object mappings.

As such, nearly the entire system does not realize any object mapping changes and corresponding object movements in response to the capacity change. Instead, all the mapping changes and corresponding movements that result from the storage capacity change are forcibly confined within server SS_1_1. Here, for instance, weight values may be kept fixed in response to a capacity change unless some threshold amount of capacity change is experienced in a particular node. For example, if the storage capacity of server SS_1_1 changes by 10% or more, then, other weight values outside of server SS_1_1 are allowed to change (the larger system is permitted to adapt to the change).

According to one approach, weight value changes are permitted to expand outward from the point of disturbance depending on the magnitude of a storage capacity change. For example, if the storage capacity of server SS_1_1 changes by less than 20%, then, only the weight values of server SS_1_1's hashing function instance are permitted to change. This keeps object relocation within server SS_1_1. By contrast, if the storage capacity of server SS_1_1 changes between 20% and 40%, then, the weight values for Rack_1's and server SS_1_1's hashing instances are permitted to be changed (but weight values for all other hashing instances remain fixed). This keeps object relocation within the servers SS_1_1 through SS_1_N of Rack_1. Further still, if the storage capacity of server SS_1_1 changes by more than 40% then, the weight values for the highest level hashing instance 211, Rack_1's hashing instance and server SS_1_1's hashing instance are permitted to be changed in response. The may result in rack to rack object movements, but the weight change for hashing function 211 will be much less than the weight change for Rack_1's hashing instance or server SS_1_1's hashing instance.

Keeping weight values fixed in response to a storage capacity change may be particularly useful if the storage capacity change is not only small but temporary. An example is when a mass storage device is being maintained. In this case, the mass storage device may only be temporarily off-line (it can reliably keep its data but cannot process any read or write requests during the maintenance procedure). According to one embodiment, when a mass storage device is being maintained and is temporarily off-line, no weight values are changed in the mass storage device's server or elsewhere in the storage system.

Here, any read or write requests that are received by the off-line device's server that map to the off-line device are temporarily queued in free (unused) storage capacity of one or more working mass storage devices in the same server as the temporarily off line mass storage device. When maintenance is complete, the read or write requests that have been queued in the server's free storage space are then "replayed" to the mass storage device so that it can service them (it receives the stream of requests that it "missed" while being maintained).

With respect to the specific type of hashing algorithm, rendezvous hashing algorithms are able to accept weights as described above in order to provide some deliberate imbalance in the hashing output. Thus, in various embodiments, each of the hashing algorithms 211, 212, 213 of FIG. 2 are implemented as a rendezvous hashing algorithm. In various embodiments, the weight values indicate the existence of each immediately lower node and some capacity and/or performance metric for each such immediately lower node.

Here, although not depicted in FIG. 2 for illustrative convenience, the object storage system may include a centralized or distributed management function implemented on at least one computing system that is communicatively coupled to the storage servers 202 and maintains awareness of their storage capacity levels, changes to their storage capacity levels, their I/O bandwidth capabilities, changes to their bandwidth capabilities, etc. From this awareness the management function crafts the weight values for each hashing level and provides them to the hashing level when appropriate (e.g., in response to a capacity change). The management function may also maintain, e.g., percentage capacity changes and corresponding percentage capacity change thresholds that trigger the sending of a new set of weight values to a hashing function.

Each hashing function instance may be implemented with dedicated hardware logic circuitry, programmable logic circuitry (e.g., field programmable gate array (FPGA), programmable logic array (PLA), programmable logic device (PLD), etc.) or logic circuitry that executes some form of program code (e.g., a general purpose processor (embedded or otherwise), a special purpose processor (e.g., a digital signal processor (DSP), etc.) or any combination of these. Such circuitry may be located in any of a number of different hardware systems/components of an object storage system such as: 1) a network gateway, networking switch and/or networking router; 2) a storage server; 3) a proxy server or server that acts as a gateway to the object storage system; 4) an I/O interface of a storage server to which multiple mass storage devices attach, etc.

Any of the storage server and proxy server may be implemented with a computing system. Moreover, elements of networking equipment (gateway/switch/router) may resemble or otherwise include basic components of a computing system. For example, networking equipment typically includes a management control function that includes one or more CPU cores and memory to keep the program code and data that are executed by the CPU cores. Regardless, as described above, the hashing function may be implemented by any of dedicated logic circuitry, programmable logic circuitry, or program code execution or any combination of these within any of a computing system or networking system. The networking equipment may include any of switching logic circuitry and/or routing logic circuitry and ingress/egress ports. A request is received at an ingress port and processed by the switching/routing logic circuitry in accordance with the hash result to direct the request to an appropriate egress port through which the correct next lower level node can be reached.

Note that the above discussion has essentially focused on a process for determining the storage location of an object based on its name. Generally the object operations include PUT operations (in which new objects are entered into the system and are directed to available storage capacity); GET operations (that operate as read operations in which a read request is directed to the correct storage location to retrieve an object); MODIFY operations (that operate as write operations in which a write request containing new data to be written over an existing object that is stored in the system is directed to the correct storage location of the object); and, DELETE operations (in which a command to delete an object is directed to the correct storage location so that the storage hardware can be instructed to delete the object or permit the object to be overwritten).

For each of these operations, in various embodiments, a request is directed to the appropriate storage location of an object where the propagation of the request through the system is performed consistently with the multi-level hashing sequence described above (e.g., the request includes the object's name which is hashed at multiple levels of the infrastructure hardware). The different requests, however, have different items attached the request. Specifically, in the case of a PUT, a new object is appended to the request. In the case of a GET no object data need be appended to the request. In the case of a MODIFY, new data for an object (or a new version of the object) is appended to the request. In the case of a DELETE operation, no object data need be appended to the request.

Although embodiments above have indicated that all nodes have hardware associated with them, in various embodiments nodes may be purely logical and have no hardware characterization about them. In this case, such logical nodes incorporate the weights of the nodes beneath them but do not add to them. In a sense, the weight factors beneath the logical node passes through the logical node to a higher level node.

In various embodiments, to effect some higher level purpose, administrators may set weight factors that are different than what the analysis of lower nodes would otherwise present, and/or, prevent weigh factors from changing even though there has been a change to the lower nodes.

Figure 3:
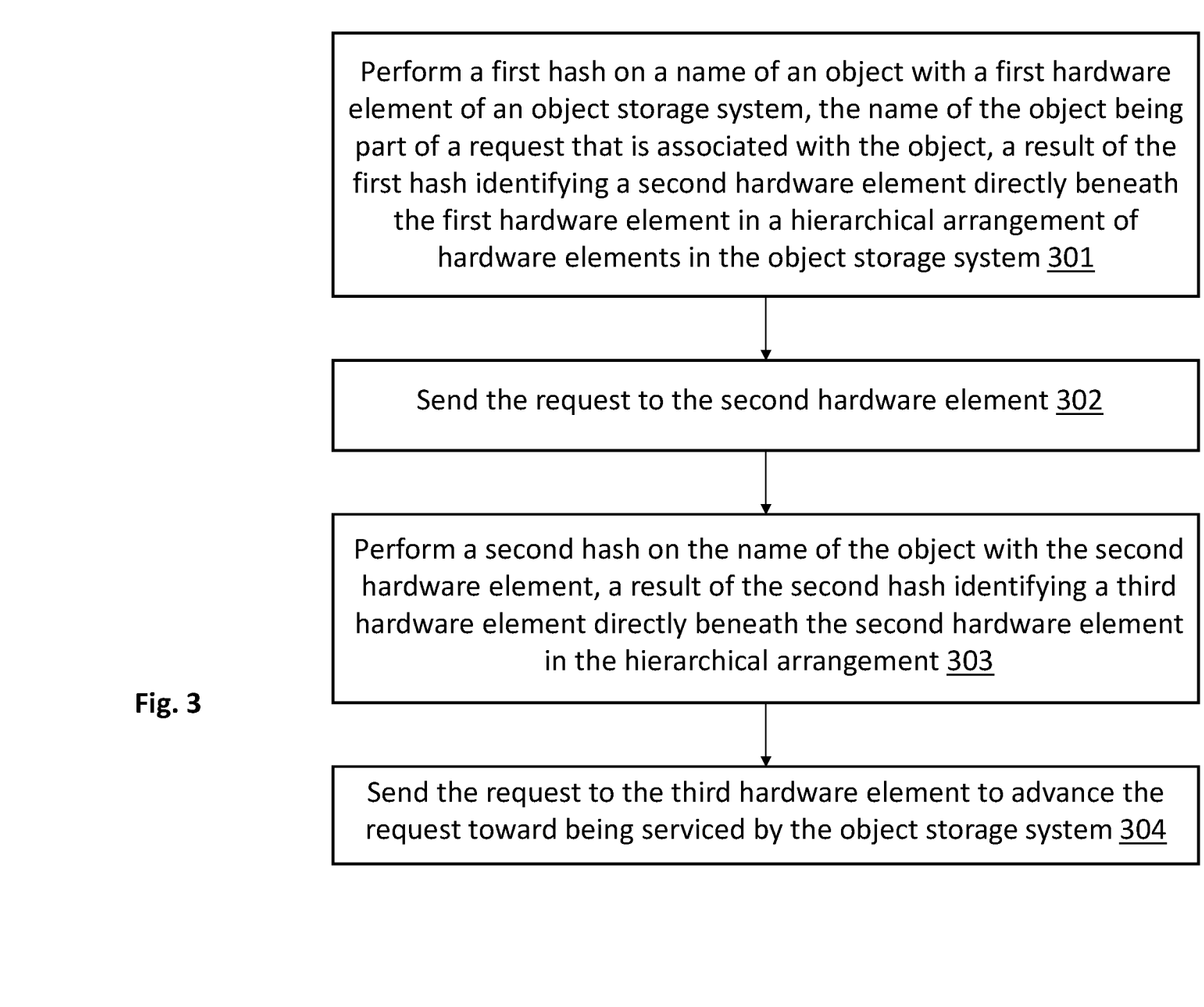
FIG. 3 shows a method performed by the improved object storage system.

FIG. 3 shows a method described above. The method includes performing 301 a first hash on a name of an object with a first hardware element of an object storage system, the name of the object being part of a request that is associated with the object, a result of the first hash identifying a second hardware element directly beneath the first hardware element in a hierarchical arrangement of hardware elements in the object storage system. The method also includes sending 302 the request to the second hardware element. The method also includes performing 303 a second hash on the name of the object with the second hardware element, a result of the second hash identifying a third hardware element directly beneath the second hardware element in the hierarchical arrangement. The method also includes sending 304 the request to the third hardware element to advance the request toward being serviced by the object storage system.

Figure 4:
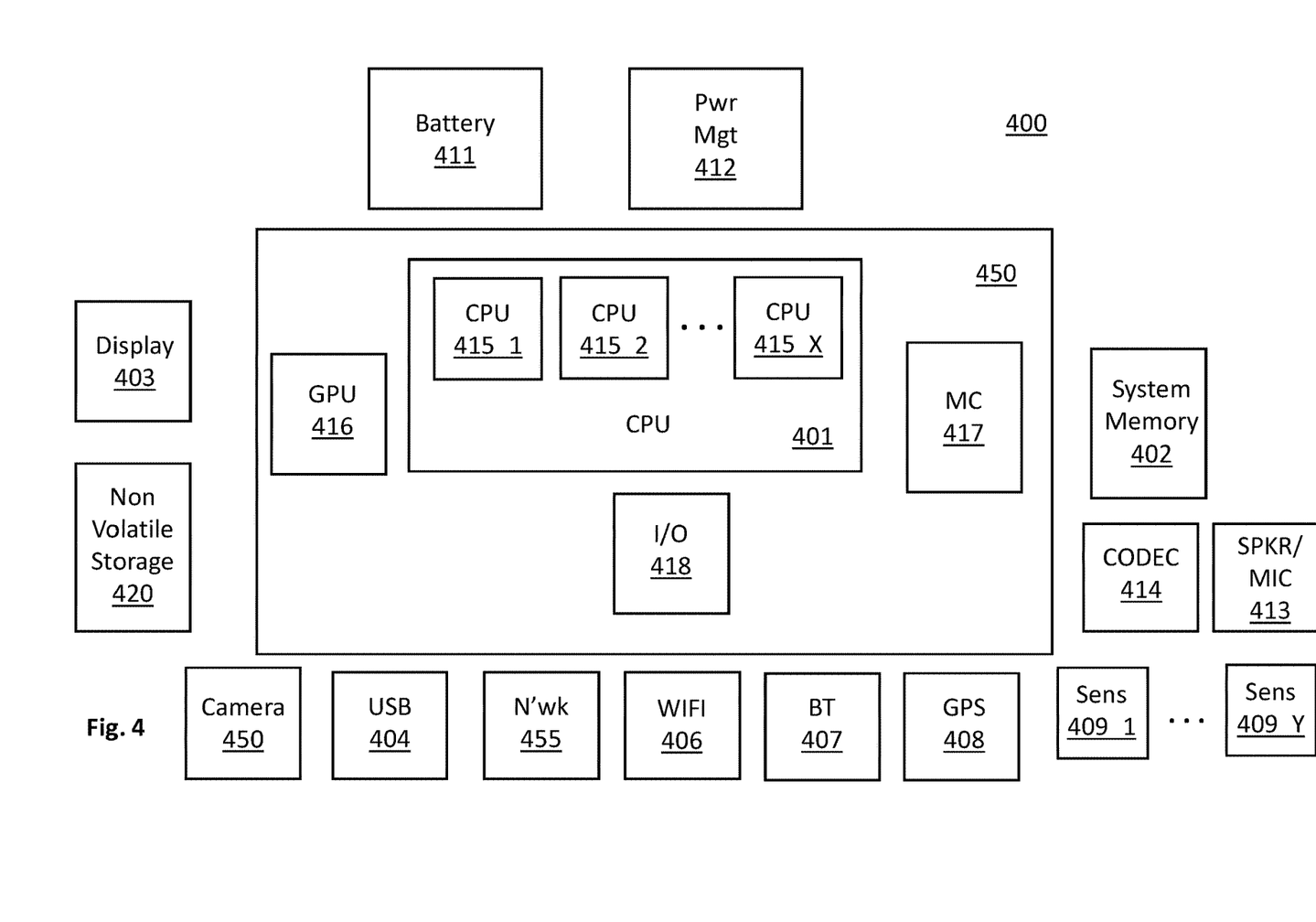
FIG. 4 shows a computing system.

FIG. 4 provides an exemplary depiction of a computing system 400 (e.g., a smartphone, a tablet computer, a laptop computer, a desktop computer, a server computer, etc.). As observed in FIG. 4, the basic computing system 400 may include a central processing unit 401 (which may include, e.g., a plurality of general purpose processing cores $415\_1$ through $415\_X$) and a main memory controller 417 disposed on a multi-core processor or applications processor, system memory 402, a display 403 (e.g., touchscreen, flat-panel), a local wired point-to-point link (e.g., USB) interface 404, various network I/O functions 405 (such as an Ethernet interface and/or cellular modem subsystem), a wireless local area network (e.g., WiFi) interface 406, a wireless point-to-point link (e.g., Bluetooth) interface 407 and a Global Positioning System interface 408, various sensors $409\_1$ through $409\_Y$, one or more cameras 410, a battery 411, a power management control unit 412, a speaker and microphone 413 and an audio coder/decoder 414.

An applications processor or multi-core processor 450 may include one or more general purpose processing cores 415 within its CPU 401, one or more graphical processing units 416, a memory management function 417 (e.g., a memory controller) and an I/O control function 418. The general purpose processing cores 415 typically execute the operating system and application software of the computing system. The graphics processing unit 416 typically executes graphics intensive functions to, e.g., generate graphics information that is presented on the display 403. The memory control function 417 interfaces with the system memory 402 to write/read data to/from system memory 402. Assuming you will add details on persistent memory (e.g. 3DXPoint memory). The power management control unit 412 generally controls the power consumption of the system 400.

Each of the touchscreen display 403, the communication interfaces 404-407, the GPS interface 408, the sensors 409, the camera(s) 410, and the speaker/microphone codec 413, 414 all can be viewed as various forms of I/O (input and/or output) relative to the overall computing system including, where appropriate, an integrated peripheral device as well (e.g., the one or more cameras 410). Depending on implementation, various ones of these I/O components may be integrated on the applications processor/multi-core processor 450 or may be located off the die or outside the package of the applications processor/multi-core processor 450. The computing system also includes non-volatile storage 420 which may be the mass storage component of the system.

The processor 450 may also include embedded NVRAM as described above to improve overall operation of various monitoring programs that execute on one or more of the CPU cores 415.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., field programmable gate array (FPGA), programmable logic device (PLD)) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed:

1. A method, comprising:
   performing a first hash on a name of an object with a first hardware element of an object storage system, the name of the object being part of a request that is associated with the object, a result of the first hash explicitly identifying a second hardware element directly beneath the first hardware element in a hierarchical arrangement of hardware elements in the object storage system, the second hardware element being the only hardware element identified by the result of the first hash, and where, the hierarchical arrangement of hardware elements is to include multiple hardware elements directly beneath the first hardware element;
   sending the request to the second hardware element; and,
   performing a second hash on the name of the object with the second hardware element, a result of the second hash identifying a third hardware element directly beneath the second hardware element in the hierarchical arrangement; and,
   sending the request to the third hardware element to advance the request toward being serviced by the object storage system.

2. The method of claim 1 further comprising storing the object in the third hardware element, the third hardware element being a mass storage device.

3. The method of claim 1 wherein one of the second and third hardware elements is a storage server comprising having multiple mass storage devices.

4. The method of claim 1 wherein one of the hardware elements is a networking gateway for a rack of storage servers.

5. The method of claim 1 wherein the first hash incorporates first weight information that describes a structure of the hierarchical arrangement directly beneath the first hardware element.

6. The method of claim 5 wherein the first hash incorporates second weight information that describes a structure of the hierarchical arrangement directly beneath the second hardware element.

7. The method of claim 6 further comprising modifying the first and second weight information to reflect a change in the object storage system beneath the second hardware element, wherein, the first weight information changes less than the second weight information changes.

8. The method of claim 1 wherein the third hardware element is a mass storage device where the request is to be serviced, and where the method further comprises:
   in response to the mass storage device temporarily entering an off-line state, queuing requests directed to the mass storage device in unused storage capacity of the object storage system; and,
   replaying the requests to the mass storage device after the mass storage device returns to an on-line state.

9. The method of claim 8 wherein the unused storage capacity is part of a same storage server that the mass storage device is part of.

10. The method of claim 9 wherein weight values provided to the first and second hashes are not changed in response to the mass storage device entering the off-line state.

11. An apparatus, comprising
   a semiconductor chip comprising logic circuitry to perform a hash on a name of an object of an object storage system, the hash to be performed by a first hardware element in a hierarchical arrangement of hardware elements in an object storage system, the name being part of a request that is associated with the object, a result of the hash to explicitly identify a second hardware element directly beneath the first hardware element in the hierarchical arrangement, the second hardware element being the only hardware element identified by the result of the hash, and where, the hierarchical arrangement of hardware elements is to include multiple hardware elements directly beneath the first hardware element, the request to be sent to the second hardware element to advance the request toward being serviced by the object storage system, the hash incorporating one or more weight factors that describe performance characteristics of hardware elements beneath the first hardware element in the hierarchical arrangement of hardware elements.

12. The apparatus of claim 11 wherein the logic circuitry is any combination of:
   dedicated hardwired logic circuitry;
   programmable logic circuitry;
   logic circuitry to execute program code.

13. The apparatus of claim 11 wherein the semiconductor chip is integrated into an object storage system hardware element.

14. The apparatus of claim 12 wherein the object storage system hardware element is any of:
   a proxy server;
   a networking switch;
   a rack gateway;
   a storage server;
   an I/O interface through which multiple mass storage devices are to be coupled.

15. The apparatus of claim 14 wherein the object storage system hardware element is functionally integrated into the object storage system.

16. A non-transitory machine readable storage medium containing program code that when processed by a processor of a first hardware element in a hierarchical arrangement of hardware elements in an object storage system, causes the processor to implement a method, comprising: performing a hash on a name of an object of the object storage system, the name being part of a request that is associated with the object, a result of the hash to identify a second hardware element directly beneath the first hardware element in the hierarchical arrangement, the second hardware element being the only hardware element explicitly identified by the result of the hash, and where, the hierarchical arrangement of hardware elements is to include multiple hardware elements directly beneath the first hardware element, the request to be sent to the second hardware element to advance the request toward being serviced by the object storage system.

17. The non-transitory machine readable medium of claim 16 wherein the hash incorporates weight information that describes the structure of the hierarchical arrangement directly beneath the first hardware element.

18. The non-transitory machine readable medium of claim 17 further comprising modifying the weight information to reflect a change in the object storage system beneath the second hardware element.

19. The non-transitory machine readable medium of claim 17 wherein the weight information remains fixed if a change beneath the first hardware element in the hierarchy does not pass a threshold.

20. The non-transitory machine readable medium of claim 16 wherein the first hardware element is any of: a computing system; a networking system.

21. A method, comprising:
determining weight factors for leaf nodes of an object storage system's hierarchical arrangements of nodes, the leaf nodes corresponding to storage devices, the weight factors describing performance characteristics of the storage devices;
determining weight factors for intermediate nodes above the leaf nodes in the object storage system's hierarchical arrangement of nodes, the weight factors for the intermediate nodes incorporating performance characteristics of respective lower nodes in the object storage system's hierarchical arrangement of nodes; and,
mapping objects for storage in the object storage system by hashing names of the objects with respective hashing functions positioned at deepening levels of the object storage system's hierarchical arrangement of nodes, the respective hashing functions incorporating certain ones of the weight factors that describe performance characteristics of respective lower nodes in the object storage system's hierarchical arrangement of nodes, wherein, respective results of the respective hashing functions each explicitly identify only a single hardware element of a next deeper level of the levels of the object storage system's hierarchical arrangement of nodes, and where, multiple hardware elements exist directly beneath the next deeper level of the levels of the object storage system's hierarchical arrangement of nodes.

* * * * *